United States Patent [19]
Gouvernelle et al.

[11] Patent Number: 5,057,973
[45] Date of Patent: Oct. 15, 1991

[54] SOLID ELECTROLYTE CAPACITOR WITH INTEGRAL STAMPED FUZE

[75] Inventors: Didier Gouvernelle, Semblancay; Michel Andrepierre, Parcay-Meslay, both of France

[73] Assignee: Sprague Electric Company, North Adams, Mass.

[21] Appl. No.: 589,240

[22] Filed: Sep. 28, 1990

Related U.S. Application Data

[63] Continuation-in-part of Ser. No. 474,572, Feb. 2, 1990, Pat. No. 4,989,119.

[30] Foreign Application Priority Data

May 29, 1990 [FR] France .................................. 9006655

[51] Int. Cl.$^5$ ............................................. H01G 9/06
[52] U.S. Cl. ..................................... 361/534; 29/25.03
[58] Field of Search ............... 361/275, 534; 29/25.03, 29/25.42

[56] References Cited

U.S. PATENT DOCUMENTS

| | | | |
|---|---|---|---|
| 4,107,762 | 8/1978 | Shirn et al. | 361/534 |
| 4,224,656 | 9/1980 | DeMatos et al. | 361/534 |
| 4,899,258 | 2/1990 | Gouvernelle | 361/534 |

FOREIGN PATENT DOCUMENTS

EP232868  8/1987  European Pat. Off. .

Primary Examiner—Donald A. Griffin

[57] ABSTRACT

A solid electrolyte capacitor in a block of electrically insulative resin is provided with two electrodes connected by respective connecting tangs to output leads (+, −) and to a fuze test lead; one connecting tang (6) is formed by a first section (6B) fixed to one of the electrodes and projecting out of the resin block to form the fuze test lead, and a second section (6A) projecting out of the resin block to form a conventional terminal; an elongate strip (10) forms the fuze in one piece with the sections (6A,6B) so as to provide the only electrical connection between the sections; the fuze is coated with a supporting mass of thermally insulative resin extending between the two sections and embedded in the resin block.

15 Claims, 4 Drawing Sheets

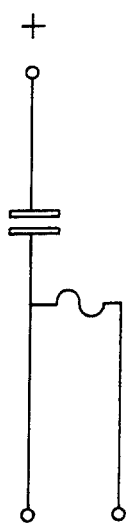
FIG.IA
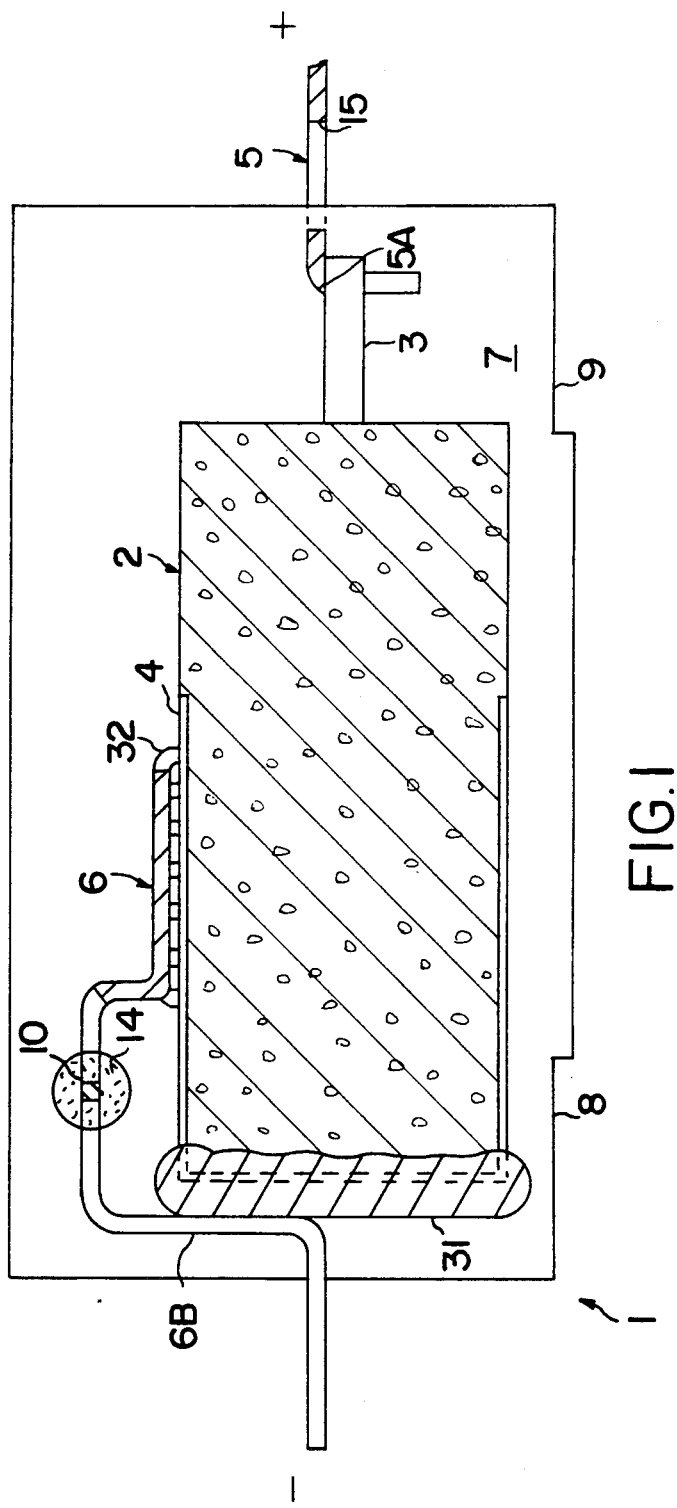
FIG.I

SOLID ELECTROLYTE CAPACITOR WITH INTEGRAL STAMPED FUZE

CROSS-REFERENCE TO RELATED APPLICATION

BACKGROUND OF THE INVENTION

This invention is concerned with providing a fuze in a solid electrolyte capacitor and relates to an improvement to the methods and the capacitors described in commonly assigned U.S. Pat. No. 4,899,258 issued Feb. 6, 1990 and U.S. application Ser. No. 07/474,572 filed Feb. 2, 1990.

A solid electrolyte capacitor, especially one of the tantalum type, essentially comprises a porous anode from which projects an anode wire. The porous anode is completely or partly covered with various layers: in practice these layers are of dielectric/oxide and of manganese dioxide substantially filling the pores of the anode and constituting the solid electrolyte, and a conductive layer forming the cathode. This structure constitutes a capacitor body which is covered with an electrically insulative material after fixing the electrodes to connecting tangs which terminate in output leads. The capacitors obtained in this way are very compact with simple geometrical shapes of cylindrical or more usually rectangular parallelepiped-shape.

With the aim among other things of reducing the unfortunate consequences of a short-circuit in a circuit comprising one or more solid electrolyte capacitors attempts have been made to integrate a fuze into the capacitor with minimum increase to its overall dimensions.

Various types of capacitors with integral fuzes are already known. Examples can be found in the documents U.S. Pat. No. 4,107,762; U.S. Pat. No. 4,224,656; EP 0,232,868; and FR 2,633,770.

The documents U.S. Pat. No. 4,224,656 and EP 0,232,868 determine the effective length of the fuze wire using an additional support member apparently needed during manufacture to hold the areas to which the ends of the fuze wire must be attached a predetermined distance apart.

The object of the previously mentioned U.S. Pat. No. 4,899,258 is to simplify further the integration of a fuze into a solid electrolyte capacitor and therefore to reduce its cost, while achieving a comparable level of performance, by eliminating any intermediate support member disposed between the negative connecting tang and the other electrode. It proposes, to this end, the provision of a predetermined effective length of calibrated fuze wire between two electrically isolated sections of the tang, which is directly connected by one of its sections to the other electrode.

The various solutions described above share the disadvantage of having no easy way to check the integrity of the fuze because it is in series with the capacitor proper, as this is essential for it to fulfil its function.

The previously mentioned patent application Ser. No. 07/474,572 is directed to meeting the object of U.S. Pat. No. 4,899,258 by additionally providing an easy way to check the integrity of the fuze by providing a solid electrolyte capacitor body fitted with two electrodes respectively connected to two connection tangs constituting the (+,−) output leads, a fuzible member of predetermined length being mounted in series between the capacitor body and a selected (−) output lead, such that the connecting tang incorporating the selected output lead is formed by a first section fixed to one of the electrodes to form a test lead and a second section electrically isolated from the first section and from the capacitor body to form the selected (−) output lead, the fuzible member providing the only electrical connection between these sections and being surrounded with a rigid or flexible and thermally insulative supporting mass of resin extending between the two sections.

SUMMARY OF THE INVENTION

An object of this invention is to achieve the same advantages as previously, especially with regard to the accuracy and the reproducibility of the fuzing characteristics of the fuze, but at lower cost and with a simpler design. It is particularly directed to avoiding the use of a separate, attached fuze requiring assembly operations.

To this end, this invention proposes a solid electrolyte capacitor of the aforementioned type in which the integral fuze is in one piece with the lead frame sections electrically separated by the fuze.

In other words, this invention proposes a solid electrolyte capacitor body embedded in a block of electrically insulative resin with two electrodes respectively electrically connected to two connecting tangs which project from the block to constitute output leads (+,−), a fuzible member of predetermined useful length being disposed in series between the capacitor body and a selected output lead (−), such that the connecting tang incorporating the selected output lead is formed by a first section fixed to one electrode of the capacitor body and projecting out of the block to form a test lead and a second section projecting out of the block to form the said (−) output lead, the second section being electrically connected to the first section and to the capacitor body only by an elongated strip of the frame in one piece with these sections and constituting the fuzible member, which is embedded in a supporting mass of rigid or flexible thermally insulative resin extending between the two sections, the supporting means being embedded in the resin block.

According to preferred features:

said sections extend parallel to each other from the fuzible member which is attached to them transversely to the exterior of the resin block to link the test and output leads;

the first and second tang sections comprise two coplanar parallel lugs joined by the fuzible member;

the elongate strip forming the fuze incorporates a central area of minimal cross-section;

said sections and said narrow strip are the same thickness and the elongate strip comprises to either side of the central area wider areas whose width is greater than that of the central area, these wider areas being joined to said sections by end areas with widths between the width of the central area and the wider areas, respectively:

the end areas are the same width as the central area;

at least one flank of the elongate strip is straight:

the supporting mass is made from a resin that is not carbonized at the temperature at which the fuzible member melts:

the supporting mass is made from a resin polymerized by ultra-violet light:

the capacitor body incorporates a porous tantalum core.

This invention also provides a method for manufacturing a solid electrolyte capacitor with an integral fuzible member in which:

a capacitor body provided with electrodes is produced:

there is cut from a constant thickness plate at least one discontinuous strip connected to a reference frame and comprising, on the one hand, two generally parallel sections joined by a transverse strip forming the fuze and, on the other hand, a third section, all three sections being fixed to said frame, one of the parallel sections being longer than the other:

the sections of the discontinuous strip are bent along transverse bending lines to their final shape:

the fuzible member is surrounded with a supporting mass of thermally insulative rigid or flexible resin extending between the parallel sections:

the capacitor body and part of the connecting tangs are overmoulded with a block of electrically insulative resin: and the tangs are separated from the reference frame to form the capacitor leads.

BRIEF DESCRIPTION OF THE DRAWINGS

Objects, characteristics and advantages of this invention emerge from the following description given by way of non-limiting example with reference to the appended drawings in which:

FIG. 1 is a cross-section of a tantalum capacitor incorporating an integral fuze of this invention:

FIG. 1A is an electrical circuit schematic of the capacitor of FIG. 1:

DESCRIPTION OF THE PREFERRED EMBODIMENTS

Figure 2:
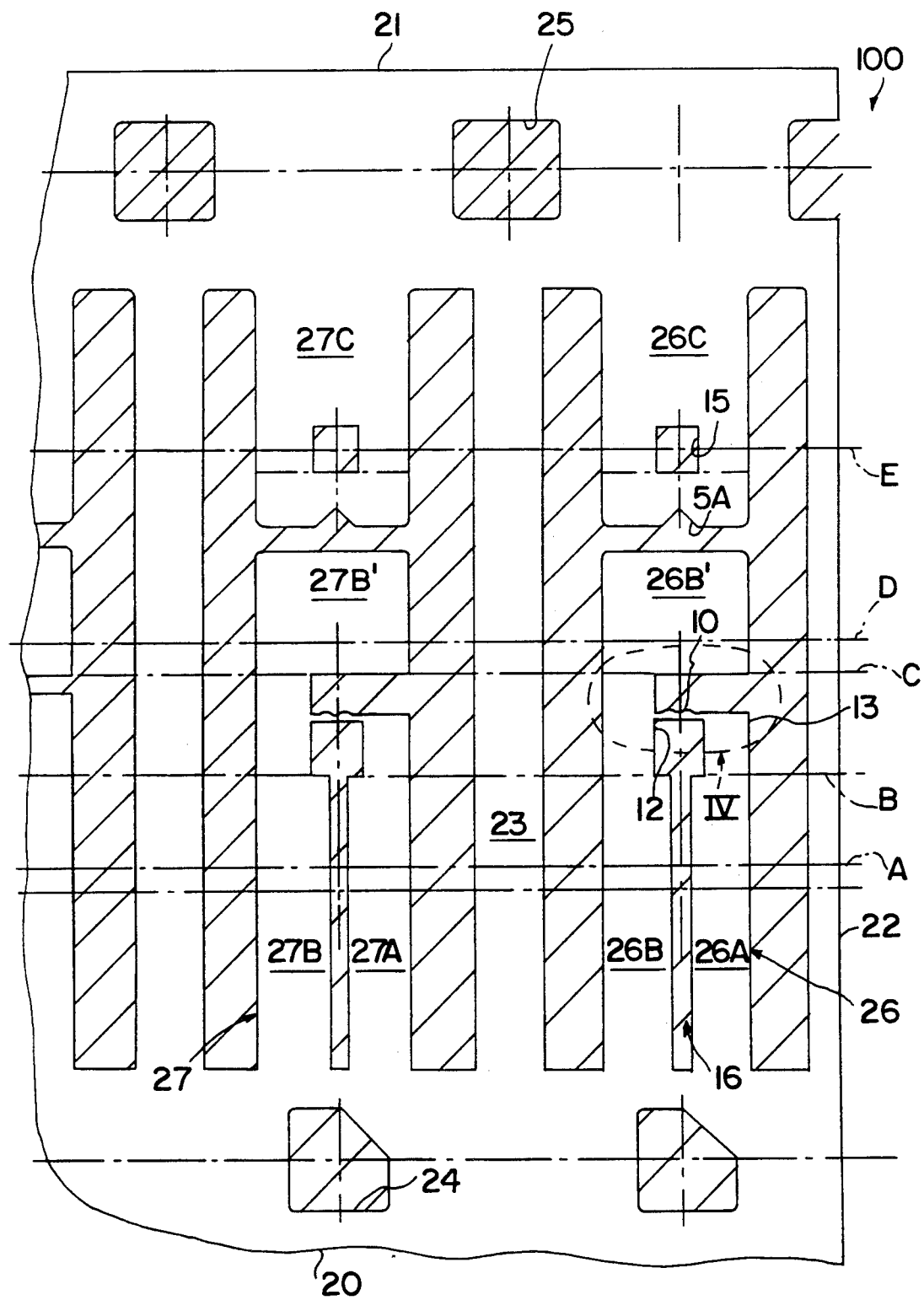
FIG. 2 is a partial plan view of a plate from which are stamped the connecting tangs of the capacitor of FIG. 1.

FIG. 1 shows a tantalum capacitor 1 comprising a capacitor body 2 from which projects a tantalum anode rod 3. The capacitor body 2 is of any appropriate known type with a surface oxidized tantalum porous core covered with a solid electrolyte formed of manganese dioxide and partially covered with various appropriate layers including an outside electrode layer 4 electrically isolated from the anode rod 3.

A conductive positive connecting tang 5 is fixed to the anode rod 3 (by means of a cut-out 5A) and a conductive negative connecting tang 6 is fixed to the electrode layer 4.

The entire assembly is embedded in a rectangular parallelepiped-shape block 7 of insulative material, in practice an epoxy resin of any appropriate type, so that the conductive tangs 5 and 6 project to form + and − output leads. Recesses 8 and 9 are provided adjacent opposite edges of the block 7 so that the free ends of the tangs 5 and 6 may be folded back for the most part within the profile of the block 7.

The conductive tang 6 is actually divided into two sections 6A and 6B the only electrical connection between which is an elongate (narrow) strip 10 perpendicular to the plane of FIG. 1 forming a calibrated fuze. One of these sections (6B in this example) extends as far as the capacitor body 2, but both 6A and 6B project externally of the block 7. Portion 6A defines a negative output lead A and the portion 6B defines a test lead B.

The fuze wire 10 is in one piece with the sections 6A and 6B, being formed by stamping, as will be explained later. The sections 6A and 6B incorporate respective parallel lugs 12 and 13 between which is a space of predetermined constant width (see FIG. 3) which determines the effective length of the fuze 10. The narrow strip 10 is embedded in a protective resin 14 which adheres to the lugs 12 and 13.

The essential role of the protective resin 14 is to provide thermal protection for the insulative resin of the block 7 if the fuze melts due to an excessively high current: this enables precise definition of the fuzing characteristics (around 1425° C. for a ferro-nickel fuze containing 41% nickel). Protective resin 14 is preferably one which does not carbonize at the temperature at which the fuze melts, so as to avoid introducing any residual resistance.

This thermally insulative protective resin 14 which does not carbonize at the temperature at which the fuze 10 melts is, for example, available under the trade names CHIPBONDER 360 or LID 1043 resin. It may equally well be a silicone resin, for example AMICON XS 2213/102.

Resin 14 may also be similar to the resin of the block 7, although it is formed before the latter block (see below) and so defines in the finished capacitor 1 an interface whereby its existence may be confirmed.

An orifice 15 may advantageously be provided in the tang 5 to strengthen its attachment to the block 7.

Figure 3:
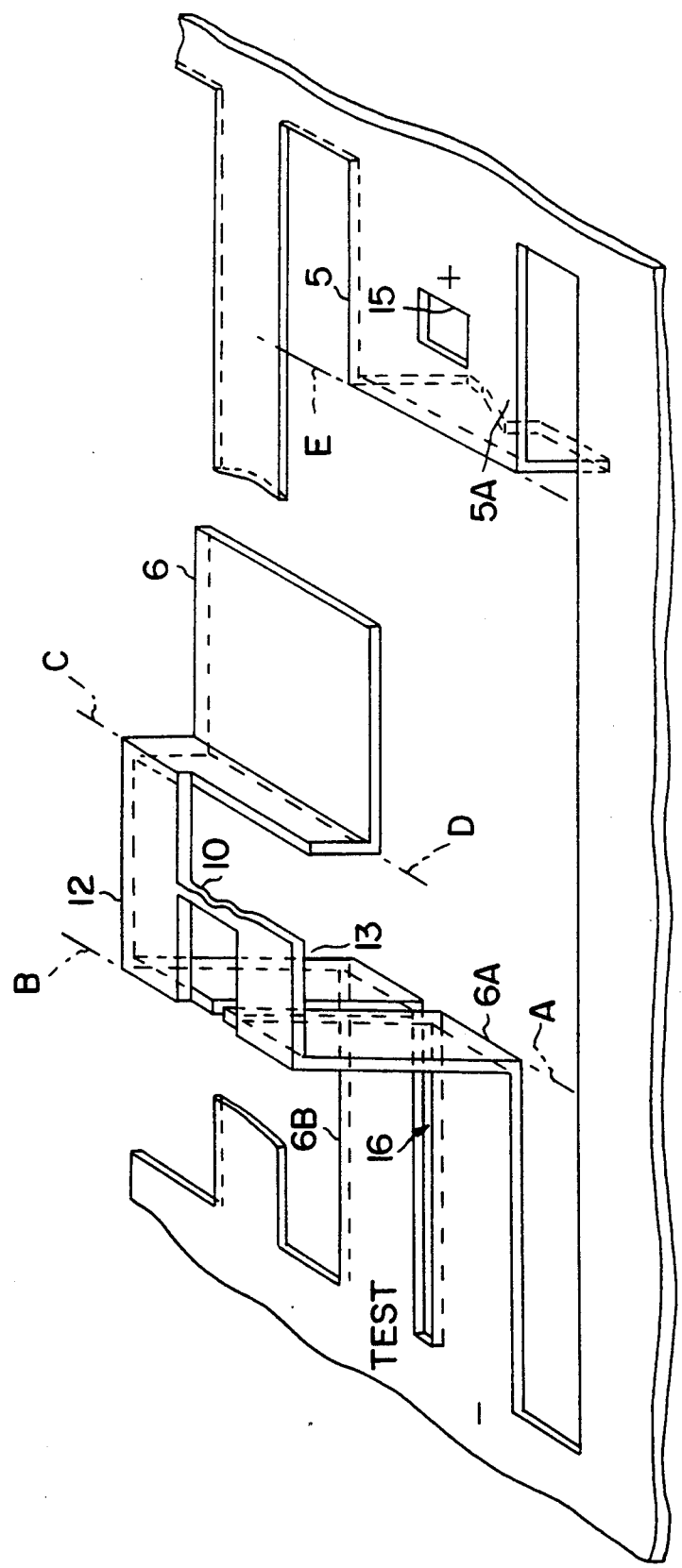
FIG. 3 is a partial perspective of the plate of FIG. 2 after being bent to shape.

FIGS. 2 and 3 show two successive stages in the manufacture of capacitor 1, selected to show the details of forming the tangs 5 and 6A/6B and the fuze 10.

FIG. 2 shows part of a constant thickness plate of lead frame 100 of electrically conductive material (for example, FN 42 iron-nickel alloy) from which various shapes (hatched areas with widely spaced hatching lines) have been cut (for example stamped) out.

The lead frame 100 comprises two horizontal strips 20 and 21 Joined by vertical strips 22, 23, etc. and includes locating holes 24 and 25. This arrangement is reproduced identically and periodically along the horizontal strips.

Within the frame of reference constituted by the strips 20 through 23 there is formed a discontinuous vertical strip 26 providing sections with coplanar flanks adapted to become the connecting tangs 5, 6A and 6B and the fuze 10 of the capacitor 1 of FIG. 1.

Starting from the horizontal strip 20 and the same end as the strip 22, the strip 26 comprises a section 26A adapted to form the tang 6A and, at the same end as the strip 23, a section 26B adapted to form the tang 6B.

The sections 26A and 26B are separated by a slot 16 which is widened between two portions of these sections adapted to form the portions 12 and 13 seen in FIG. 3. The transverse strip 10 separates this widened end of the slot 16 from a space opening laterally towards the right between the ends of the section 26A and the widened head 26B' of the section 26B.

The strip 26 finally comprises a section 26C attached to the horizontal strip 21 and adapted to form the lug 5 of the capacitor 1, in which are formed the hole 15 and the cut-out 5A of the section 5.

A strip 27 to the left of the strip 26 likewise comprises similar sections 27A, 27B and 27C, and so on.

Figure 4:
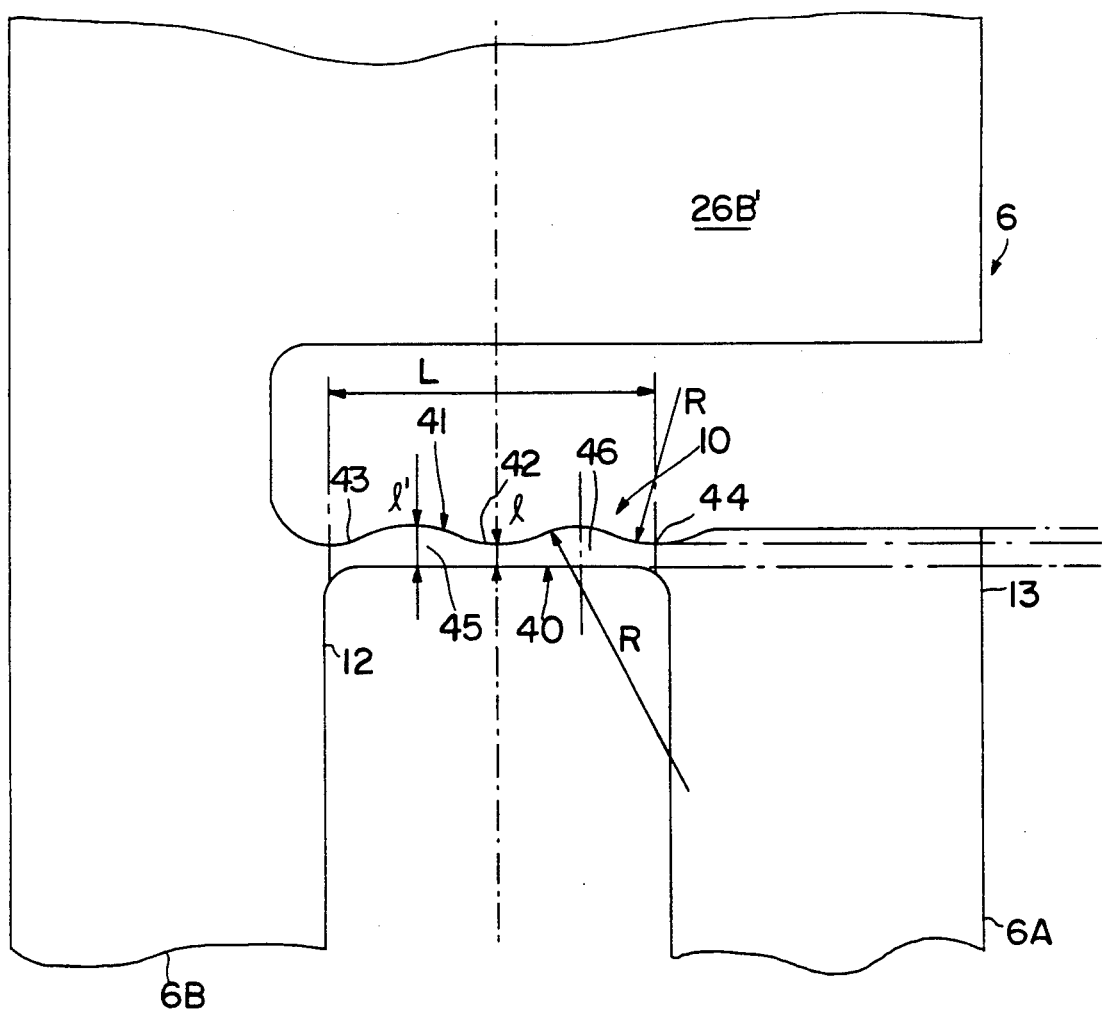
FIG. 4 is an enlarged view of detail IV of FIG. 2.

FIG. 4 shows the tang 10 in detail with, on the side of the slot 16, a straight flank 40 and, on the side of the section 26B, an undulating flank 41 having three troughs separated by two peaks. The tang 10 therefore comprises three areas of minimal width of which the central area 42 is to become the (accurately localized) area of the fuze which blows, while the end areas 43 and 44 which connect the fuze 10 to the strips 12 and 13 are provided to minimize diffusion towards the strips 12 and 13 of the heat released when the fuze blows.

The wider areas 45 and 46 enable the strip 10 to be gripped firmly during stamping, so as to prevent the metal flowing in the stamping die.

It is mainly the width 1 of the central area 42 which requires to be defined with great accuracy: the end areas 43 and 44 have a width which is the same as or greater than that of the central area. The areas 45 and 46 have, for example, a width 1' of around twice that 1 of the central area. In practice the undulating flank 41 has the same radius of curvature R in its troughs and peaks.

To give an example, the fuze strip has a length L of 0.8 mm with 1=0.06 mm, 1'=0.1 mm, and R=0.2 mm, and a thickness of approximately 0.1 mm.

With the materials specified above, these dimensions are such that the central portion of the fuze melts in less than 5 s with a current of 3.5 A.

In an alternative embodiment the flank 40 can also be undulating with three troughs and two peaks, the flank 41 retaining its undulating profile or being straight.

In a further alternative embodiment both flanks 40 and 41 are straight.

Other shapes are feasible for the strip 10, for example a single central area of reduced thickness, the width of the strip being substantially constant.

The manufacture of the capacitor continues by bending the stamped plate 100 along the bending lines A through E so as to impart to the sections of the strips 26 and 27 the configuration required for the tangs 5, 6A and 6B. The bending lines are shown in FIG. 3. This bending is not applied to the strips 22, 23, etc. which with the strips 20 and 21 therefore define a reference plane.

The protective resin 14 is then applied to the strip 10. For reasons of ease of use, the resin 14 is advantageously of a type which polymerizes on exposure to ultra-violet light. As previously mentioned, it is advantageously CHIPBONDER 360 or LIK 1043 resin. It may equally well be AMICON XS 2213/102 SILICON resin, etc.

A capacitor body 2 is prepared and the (usually silver-plated) edge opposite the anode rod 3 is advantageously covered with a layer 31 of any appropriate type insulative resin to prevent any possibility of short-circuiting between this edge and the vertical part of the sections 6B and 6A of the tang 6. Alternatively this insulative resin is applied directly to the vertical part of the sections 6B and 6A.

The capacitor body 2 is then offered up to the sections 5, 6A and 6B; the horizontal part of the section 6B is bonded to the body 4, in practice with adhesive 32 containing silver, and the tang 5 is welded to the tantalum wire 3.

The combination of the capacitor body and the tangs 5, 6A and 6B is then placed between the component parts of a mould, using the strips 20 through 23 as locators. The resin 7 is injected and when it has polymerized (in practice at high temperature) the capacitor is removed from the mould. This moulding operation is carried out for each strip 26, 27 etc. stamped out from the plate 100.

It then remains only to cut the areas joining the tangs 6A and 6B to the strips 20 and 21. The capacitor 1 with integral fuze 10 is then ready for use. The + and A ends of the strips 5 and 6A are the connecting leads for the capacitor with the integral fuze 10. The end B of the strip 6B is the test lead which can be used to verify the continuity of the fuze (tested between A and B).

The foregoing description has been given by way of non-limiting, illustrative example only and numerous variations thereon may be put forward without departing from the scope of the invention. For example, the fuzible strip might be provided in the positive tang; it could equally well be provided at the end of the capacitor body rather than at one side.

What is claimed is:

1. A solid electrolyte capacitor (1) comprising a capacitor body (2) embedded in a block (7) of electrically insulative resin, said body (2) provided with two electrodes (3,4) respectively electrically connected to two connecting tangs (5,6) projecting from said block (7) to constitute the output leads (+,−) a fuzible member (10) of predetermined useful length being disposed in series between the capacitor body (2) and a selected of said output leads: characterized in that said connecting tang (6) incorporating said selected output lead is formed by a first section (6B) fixed to one electrode (4) of the capacitor body (2) and projecting out of the block to form a test lead (B) and a second section (6A) projecting out of the block (7) to form said output lead (−), the second section being electrically connected to the first section (6B) and to the capacitor body (2) only by an elongate strip (10) in one piece with said sections and constituting said fuzible member, which is embedded in a supporting mass of rigid or flexible thermally insulative resin (14) extending between the two sections, said supporting mass (14) being embedded in the resin of the block (7).

2. A capacitor according to claim 1 wherein said sections (6A,6B) extend parallel to each other from said fuzible member (10) which is attached to them transversely to the exterior of the block (7) to link the test and output leads.

3. A capacitor according to claim 1 wherein said first and second tang sections (6A,6B) comprise two planar parallel lugs (12,13) joined by said fuzible member (10).

4. A capacitor according to claim 1 wherein said elongate strip forming the fuze incorporates a central area (42) of minimal cross-section.

5. A capacitor according to claim 4 wherein said sections and said narrow strip are the same thickness and the elongate strip comprises to either side of the central area wider areas (45,46) whose width 1' is greater than that 1 of the central area, these wider areas being joined to said section by end areas (43,44) with widths between the widths of the central area and the wider areas, respectively.

6. A capacitor according to claim 5 wherein said end areas are the same width as said central area.

7. A capacitor according to claim 5 wherein at least one flank (40,41) of said elongate strip is straight.

8. A capacitor according to claim 1 wherein said supporting mass (14) is made from a resin that is not carbonized at the temperature at which said fuzible member (10) melts.

9. A capacitor according to claim 8 wherein said supporting mass (14) is made from a resin polymerized by ultra-violet light.

10. A capacitor according to claim 1 wherein said capacitor body (2) incorporates a porous tantalum core.

11. A method for manufacturing a solid electrolyte capacitor with integral fuzible member, said method comprising:

providing a body (2) with electrodes;

cutting from a constant thickness plate (100) at least one discontinuous strip (26,27) connected to a reference frame (20-23) providing two generally parallel sections (26A,26B,25C: 27A,27B) joined by a transverse strip (10) forming a fuze and a third section (26C,27C), all three sections being fixed to said frame, one of the parallel sections (26B,27B) being longer than the other (26A,27A):

bending sections of the discontinuous strip along transverse bending lines (A,B,C,D,E) to their final shape:

surrounding said fuzible member (10) with a supporting mass (14) of thermally insulative resin extending between the parallel sections:

overmolding said capacitor body and part of the connecting tangs with a block (7) of electrically insulative resin; and separating said tangs (5,6A and 6B) from the reference frame (20-23) to form the capacitor leads (+,−,10).

12. A method according to claim 11 wherein said supporting mass (14) is formed by exposing to ultra-violet light a resin polymerized by ultra-violet light.

13. A method according to claim 11 wherein said elongate strip forming said fuze incorporates a central area (42) of minimal cross-section.

14. A method according to claim 13 wherein said sections and said narrow strip are the same thickness and said elongate strip incorporates to either side of the central area wider areas (45,46) the width 1' of which is greater than that 1 of the central area, the wider areas being connected to said sections by end areas (43,44) the width of which is between the widths of said central area and said wider areas, respectively.

15. A method according to claim 14 wherein said end areas are the same width as said central area.

* * * * *